United States Patent
Niwa et al.

(10) Patent No.: US 8,822,013 B2
(45) Date of Patent: Sep. 2, 2014

(54) WOVEN FABRIC FOR SWIMSUITS, AND SWIMSUIT

(75) Inventors: Ujiteru Niwa, Otsu (JP); Hiroaki Date, Otsu (JP); Keiko Kasahara, Osaka (JP); Akira Watanabe, Osaka (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 13/990,925

(22) PCT Filed: Nov. 7, 2011

(86) PCT No.: PCT/JP2011/075535
§ 371 (c)(1), (2), (4) Date: May 31, 2013

(87) PCT Pub. No.: WO2012/073648
PCT Pub. Date: Jun. 7, 2012

(65) Prior Publication Data
US 2013/0247268 A1     Sep. 26, 2013

(30) Foreign Application Priority Data
Dec. 1, 2010 (JP) .................. 2010-268016

(51) Int. Cl.
B32B 27/36 (2006.01)
A41D 7/00 (2006.01)
D03D 11/02 (2006.01)
D03D 15/08 (2006.01)
D03D 1/00 (2006.01)
C08J 5/18 (2006.01)

(52) U.S. Cl.
CPC ... A41D 7/00 (2013.01); C08J 5/18 (2013.01); B32B 27/36 (2013.01); D03D 11/02 (2013.01); D03D 15/08 (2013.01); D10B 2401/021 (2013.01); D10B 2507/00 (2013.01); D03D 1/00 (2013.01)
USPC .......... 428/141; 2/67; 428/103; 428/142; 442/76

(58) Field of Classification Search
CPC .............. A41D 7/00; B32B 5/18; B32B 5/22; B32B 27/04; B32B 27/12; B32B 5/02; D03D 1/00; D03D 11/02; D10B 2507/00; D10B 2401/021
USPC .......... 2/67; 428/43, 103, 141, 142, 156, 212, 428/913; 442/76, 77, 79, 86, 87, 88, 89, 90, 442/97, 98, 99
See application file for complete search history.

(56) References Cited

U.S. PATENT DOCUMENTS

| | | | |
|---|---|---|---|
| 6,647,550 B1 * | 11/2003 | Matsuzaki et al. | 2/67 |
| 2006/0251859 A1 * | 11/2006 | D'Urso | 428/141 |
| 2013/0059123 A1 * | 3/2013 | Wang et al. | 428/164 |

FOREIGN PATENT DOCUMENTS

| | | |
|---|---|---|
| JP | 55-026243 | 2/1980 |
| JP | 55-026243 A | 2/1980 |

(Continued)

OTHER PUBLICATIONS

Kodama, Y., "Skin Friction Reduction of Ships by Microbubbles," *Nagare*, 2001, vol. 20, pp. 278-284 (including two sheets of English translation of the Abstract).

*Primary Examiner* — Arti Singh-Pandey
(74) *Attorney, Agent, or Firm* — DLA Piper LLP (US)

(57) ABSTRACT

A cloth for swimsuits includes synthetic fiber multifilament yarns and elastic fibers, wherein a front surface and a back surface of the cloth have a water-repellent finish(es); bumps and hollows are formed on the back surface; the bumps and hollows on the back surface have a height difference of 150 μm to 650 μm; and the hollows have a width of 100 μm to 5000 μm.

16 Claims, 4 Drawing Sheets

(56) References Cited

FOREIGN PATENT DOCUMENTS

| JP | 01-213403 A | 8/1989 |
| JP | 08-041708 | 2/1996 |
| JP | 08-041708 A | 2/1996 |
| JP | 08-311751 A | 11/1996 |
| JP | 09-049107 A | 2/1997 |
| JP | 2000-314015 | 11/2000 |
| JP | 2000-314015 A | 11/2000 |
| JP | 2008-150767 A | 7/2008 |
| JP | 2010-138496 | 6/2010 |
| JP | 2010-138496 A | 6/2010 |
| WO | 2004/001112 | 12/2003 |
| WO | 2004/001112 A1 | 12/2003 |

* cited by examiner

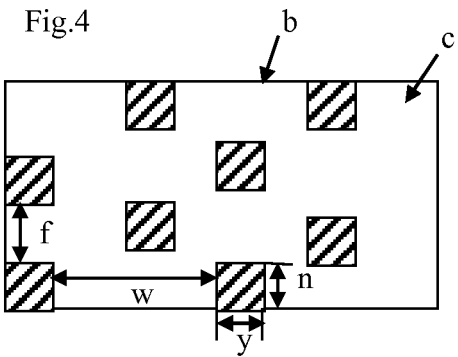
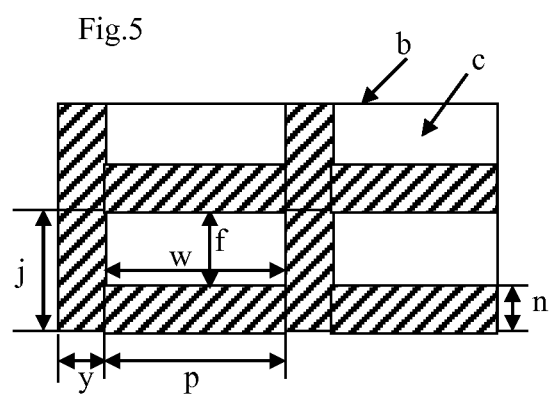
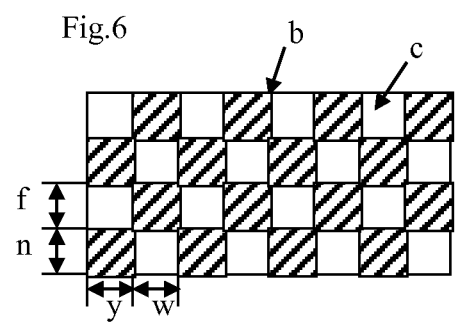

WOVEN FABRIC FOR SWIMSUITS, AND SWIMSUIT

TECHNICAL FIELD

This disclosure relates to an elastic cloth comprising synthetic fibers and elastic fibers and more particularly to a cloth for swimsuits that cause low resistance between the cloth and water and a swimsuit made thereof.

BACKGROUND

In the world of competitive swimming such as Olympics in which swimmers compete to reduce the time by 1/100 second, resistance that occurs between a swimsuit and water (hereinafter referred to as "water resistance") is a big problem. For example, in the case of a male freestyle top swimmer who swims 100 m in 50 seconds to 47 seconds, the water pressure on his body is as high as 10 kgf (≈98.1 N) or more. In such circumstances, development of a material for swimsuits with less water resistance will lead to an improved record of swimmers.

Meanwhile, in the long history of development related to materials for swimsuits for competitive swimming and to swimsuits, swimsuits for competitive swimming in which swimmers compete in swimming speed have been sewed to fit using a stretch knit because ease of movement in swimming is of most importance. Further, swimsuits made of a knit having fine stitches and reduced knit surface roughness have been produced, the swimsuits being obtained by reducing the total filament fineness of synthetic fiber multifilament yarns used for a knit material for swimsuits or by increasing the number of filaments while reducing the monofilament fineness of the synthetic fiber multifilament yarns to reduce the water resistance of the swimsuits.

However, such knit swimsuits, though they are easy to move with and cause relatively small water resistance, are prone to damage such as pilling, irregular fuzz, or breakage of the swimsuit surface because they are made by knitting thin yarns or yarns having a small monofilament fineness and a large number of filaments, and tend to have a shorter usable lifespan. In addition, because of the larger number of filaments and their small monofilament fineness, the knit swimsuits are likely to be less high-quality: for example, the color development ability decreases.

Further, a swimsuit made by applying an aqueous solution of a high-molecular-weight linear organic polymer to a fiber surface has been proposed (see JP 01-213403 A). The swimsuit can reduce water resistance due to application of the Toms effect and is suitable particularly for competitive swimming. However, since the swimsuit is made by applying an aqueous polymer solution to a swimsuit surface, it is likely to have such a fundamental problem that the polymer dissolves in water to pollute a pool and, at the same time, result in poor performance durability.

Further, there is a swimsuit obtained by calendering one surface of a knitted fabric with heat and pressure to smooth the one surface of the knitted fabric to reduce water resistance, but its performance is still not satisfactory.

Further, a knit (see JP 08-311751 A) and a competitive swimming swimsuit (see JP 09-049107 A) obtained by smoothing a knit surface to reduce water resistance without impairing the ease of movement in swimming and providing water-repellent parts and non-water-repellent parts and have a prescribed elongation have been proposed. However, they are still not sufficiently satisfactory.

Meanwhile, in an attempt to alleviate the discomfort associated with a cold body, a texture obtained by providing a water-repellent finish on the whole surface of a knit or cloth comprising polyurethane elastic yarns has been proposed (see JP 55-026243 A). The cloth has the effect of alleviating the discomfort associated with the cold during wear because the polyurethane elastic yarns are not deteriorated by chlorine in a pool and the swimsuit itself does not absorb much water. Therefore, this technique does not involve an idea of reducing the water resistance that occurs between water and a swimsuit.

In recent years, a swimsuit for competitive swimming intended to control a turbulent flow that occurs in swimming and exert a straightening effect by providing a water-repellent finish on the surface of a knit and also providing groove portions in which a plurality of fine grooves are formed along the body length has been proposed (see JP 2000-314015 A). Further, a swimsuit for competitive swimming intended to exert the effect of reducing the water resistance between water and the swimsuit by sticking a panel made of a polyurethane sheet material on the trunk region, chest region, femoral region, or the like of the swimsuit made of a cloth material and reducing the shape resistance by suppressing the irregular shape of a body by tightening the body been proposed (see JP 2008-150767 A). However, these swimsuits also have problems such as difficulty in putting on and taking off, time-consuming production, and the like, and are still not sufficiently satisfactory.

Further, using a stretch cloth having a low basis weight and a high elasticity that a knit material cannot achieve for a swimsuit has also been proposed (see JP 2010-138496 A). However, this technique does not involve an idea of reducing the water resistance between water and the swimsuit.

Meanwhile, in the field of ships different from swimsuits, studies to reduce the friction resistance between water and a ship using microbubbles (hereinafter "microbubbles") have been conducted since 1990's. Specifically, they are studies of a technique for reducing the friction resistance of water that the wall surface of a substance encounters by forming a thin air layer by injecting microscopic bubbles (microbubbles) into a boundary layer between water and the substance, the boundary layer being along the wall surface of the substance moving forward in water.

In the technique for developing ships, a field of specific developmental use, ships that are large and move forward slowly, in particular, large tankers that play a major role in marine transportation and the like are said to be more suitable for application of microbubbles, and practical application thereof have actually been achieved. This has reduced the power to drive a large ship and facilitated increased speed.

The mechanism of reduction in friction resistance by microbubbles has not been definitely established yet. One possible mechanism is the density effect; that is, the density of air is as low as about 1/1000 of the density of water and, therefore, bubbles gather near the surface of a substance and are distributed in a layer, which reduces the friction of water. Another reduction mechanism is the turbulent flow-preventing effect; that is, bubbles prevent the turbulent flow in the boundary layer, a primary cause of friction. It is said that the synergistic effect of these two mechanisms provides the effect of reducing the friction drag between water and a ship by microbubbles.

For a specific structure of a submerged portion of a ship, a microscopic irregularly-shaped layer is formed on the surface of the submerged portion by painting, and the irregularly-shaped layer is coated with a water-repellent material. Meanwhile, compressed air is jetted from a compressor installed inside the ship through a thin nozzle to the outside of the ship (the surface of the irregularly-shaped layer coated with the water-repellent material). This will form a thin air layer of microbubbles on the periphery of the submerged portion of the ship (Nagare 20 (2001) 278-284, Feature article: Fluid Mechanics in the Ocean "Reduction in friction drag of ship by microbubbles").

However, no case has been found in which the idea of such a technique for reducing the friction drag between water and a ship by microbubbles is applied to a swimsuit.

There is thus a need to overcome the defects of a swimsuit made of a knit or cloth for swimsuits as mentioned above and to provide a cloth for swimsuits that satisfies various properties (elongation, basis weight, thickness, ease of movement, durability in use, mechanical strength, aesthetics, and the like) required for a material for swimsuits, and at the same time have a texture design that generates microbubbles by which water resistance can be more reduced than before when a swimmer swims wearing a swimsuit made of the cloth, and a swimsuit made thereof.

SUMMARY

We thus provide:
(1) A cloth for swimsuits comprising synthetic fiber multifilament yarns and elastic fibers, wherein the front surface and the back surface have a water-repellent finish(es); bumps and hollows are formed on the back surface; the bumps and hollows on the back surface have a height difference of 150 μm to 650 μm; and the hollows have a width of 100 μm to 5000 μm.
(2) The cloth for swimsuits according to (1) above, wherein the synthetic fiber multifilament yarns are selected from at least one of polyester fibers, polyamide fibers, and polypropylene fibers.
(3) The cloth for swimsuits according to (1) or (2) above, wherein a composite yarn composed of the elastic fibers as a core yarn and the synthetic fiber multifilament yarns as a sheath yarn is used for warp and weft.
(4) The cloth for swimsuits according to any one of (1) to (3) above, wherein bumps and hollows are formed also on the front surface; the bumps and hollows of the front surface has a height difference of 0.5 μm to 130 μm; and the interval between the bumps is 0.5 μm to 180 μm.
(5) The cloth for swimsuits according to any one of (1) to (4) above, wherein on the back surface, the hollows account for 30% or more of the total area of the back surface.
(6) The cloth for swimsuits according to any one of (1) to (5) above, wherein the bumps and hollows on the back surface are formed by a cloth construction and/or embossing.
(7) The cloth for swimsuits according to (6) above, wherein the cloth construction is a double-cloth construction.
(8) The cloth for swimsuits according to any one of (1) to (7) above, wherein the front surface is smoothed.
(9) A swimsuit using the cloth according to any one of (1) to (8) above at at least a portion thereof, wherein the front surface of the cloth is on the right side.

We provide a cloth for swimsuits having a texture design that generates microbubbles by which water resistance can be more reduced than before when a swimmer swims wearing a swimsuit made of the cloth while maintaining various properties (elongation, basis weight, thickness, ease of movement, durability in use, mechanical strength, aesthetics, and the like) required for a cloth for swimsuits, and a swimsuit made thereof.

BRIEF DESCRIPTION OF THE DRAWINGS

FIG. 4 is a schematic plan view of the back surface of an example of the cloth for swimsuits.
FIG. 5 is a schematic plan view of the back surface of an example of the cloth for swimsuits.
FIG. 6 is a schematic plan view of the back surface of an example of the cloth for swimsuits.

DESCRIPTION OF SYMBOLS

M: Swimsuit
S: Human skin
E: Water
B: Layer of microbubbles
P: Water pressure
a: Front surface layer
b: Back surface layer
c: Hollows (air-trap portion)
f: Length of hollows
h: Height difference of bump/hollow shape (Bump height)
j: Bump length
k: Thickness
n: Bump length
p: Bump width
w: Hollow width
y: Bump width
1: Tank
2: Water
3: Roll
4: Torque motor
5: Axis
6: Digital indicator

DETAILED DESCRIPTION

Our cloth comprises synthetic fiber multifilament yarns and elastic fibers, its front surface and back surface having a water-repellent finish, and has bumps and hollows that serve as an air-trap portion at least on the cloth back surface corresponding to the side that comes into contact with skin when worn as a swimsuit. The bumps and hollows on the cloth back surface have a height difference of 150 μm to 650 μm, and the hollows have a width of 100 μm to 5000 μm.

Our cloth and swimsuits will now be described in detail with reference to FIG. 1.

Figure 1:
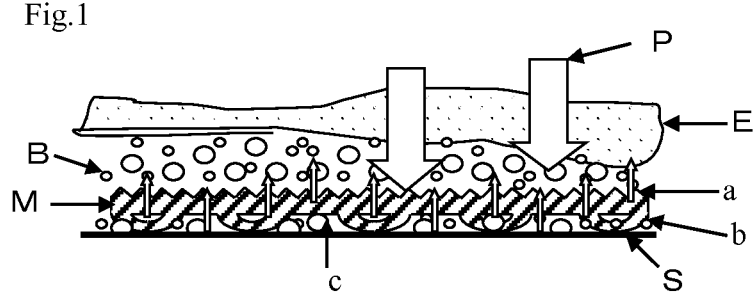
FIG. 1 is conceptual diagram illustrating our concepts.

A swimsuit (M) shown in FIG. 1 is obtained by sewing the cloth and, in the swimsuit (M), a front surface layer (a) of a swimsuit material has microscopic bumps and hollows, and a back surface layer (b) has bumps and hollows larger than those of the front surface layer (a). Further, the front surface layer (a) and the back surface layer (b) of the cloth swimsuit (M) have a water-repellent finish.

The swimsuit (M) is worn such that the back surface comes closely in contact with human skin (S). The back surface layer (b) of the swimsuit has a shape of bumps and hollows, and the hollows of the back surface layer (b) can be an air-trap portion.

For example, consider the case of a swimmer who breast-strokes wearing the swimsuit (M). First, immediately before diving from a starting platform, air is trapped in hollows (c) of the back surface layer (b) of the swimsuit. Next, the swimmer, upon diving from the starting platform, goes straight ahead in a streamline in water (E). At this time, the front surface layer (a) of the swimsuit is subjected to water pressure (P) and, consequently, mass of air trapped in the hollows (c) of the back surface layer (b) of the swimsuit tends toward the water surface under the action of buoyancy. However, the mass of air is exhausted to the side of the front surface layer (a) of the swimsuit as microbubbles because it is pushed out through minute voids between synthetic fiber multifilament yarns that form the swimsuit (M) or microscopic voids formed at intersections of warp and weft.

Then, the body floats above the water surface from the streamline in the water. Specifically, about ⅓ of the body floats up upon paddling the water with both hands. At this time, the swimsuit comes into contact with air and, consequently, air is trapped again in the hollows (c) of the back surface layer (b) of the swimsuit. Then, the body sinks into the water (E) upon stretching both hands. The front surface layer (a) of the swimsuit is subjected to the water pressure (P) and, similarly to the above, air trapped in the hollows (c) of the back surface layer (b) is pushed out through narrow gaps between synthetic fiber multifilament yarns of the swimsuit (M) or gaps formed at intersections of warp and weft constituting the cloth, and exhausted to the side of the front surface layer (a) as microbubbles. Then, about ⅓ of the body floats up upon paddling the water with both hands, and air is trapped again in the hollows (c) of the back surface layer (b).

As described above, by repeating the trapping of air into the hollows (c) of the back surface layer (b) and the exhaustion, microbubbles are exhausted to the side of the front surface layer (a).

On the other hand, the front surface layer (a) of the swimsuit has a microscopic bump/hollow shape due to thin monofilaments of synthetic fiber multifilament yarns, and has water-repellency. Therefore, microbubbles exhausted from the side of the back surface layer (b) of the swimsuit to the side of the front surface layer (a) is readily retained in the hollows of the microscopic bump/hollow shape because of the action of the water pressure (P) and the water-repellency of the front surface layer (a) having a microscopic bump/hollow shape. Consequently, a layer of microbubbles (B) is formed between the front surface of the swimsuit and the water.

A layer of microbubbles is thus formed at the side of the front surface of the cloth in the manner described above.

Some say that the definition of microbubble is still unclear academically. It is said that, in a broad sense, it is an "ultra-microscopic bubble" that is submillimeter and of microsize, and in a narrow sense, it is defined as a "bubble having a diameter of ten to several tens μm at its generation."

Our material for swimsuits is made of a cloth. A swimsuit made of a cloth, compared to a knit swimsuit, can be thin and lightweight, and can have strong physical properties such as snag resistance.

The cloth comprises synthetic fiber multifilament yarns and elastic fibers that provide stretchability as a swimsuit.

As synthetic fiber multifilament yarns, it is preferable to use those selected from at least one of polyester fibers, polyamide fibers, and polypropylene fibers. Namely, examples of synthetic fiber multifilament yarns include synthetic fibers such as aromatic polyester fibers such as polyethylene terephthalate, polytrimethylene terephthalate, and polybutylene terephthalate; aromatic polyester fibers obtained by copolymerization of an aromatic polyester with a third component; aliphatic polyester fibers represented by those mainly composed of L-lactic acid; polyamide fibers such as Nylon 6 and Nylon 66; and polypropylene fibers, excluding elastic fibers (fibers having rubber-like elasticity) that comes under JIS L0204-3 (2009). These synthetic fibers can be used alone or as a mixture of two or more thereof, and fibers mainly composed of polyester fibers or polyamide fibers are particularly preferred.

When employing polyester fibers, ordinary polyester fibers are generally dyed using disperse dyes. However, the disperse dyes can cause poor fastness such as color staining in an end product because they pollute polyurethane fibers. Therefore, it is more preferable to use cationic-dyeable polyester fibers which can be dyed with a cationic dye.

The synthetic fiber may be a filament yarn such as a false-twist textured yarn, a Taslan textured yarn, or a combined filament yarn as well as an ordinary flat yarn.

For the yarn form of the synthetic fiber, not a monofilament but multifilament yarns are used. A monofilament will cause rough touch and poor wearing comfort.

The number of filaments of the multifilament yarns is preferably 5 to 100 filaments, and more preferably 24 to 72 filaments. When the number of filaments is less than 5 filaments, the feeling tends to be course and hard, which is not preferred. When it is more than 100 filaments, physical properties such as snag are likely to be poor, which is not preferred.

The thickness of the multifilament yarns is not particularly limited, but, for example, it is preferably 22 dtex to 110 dtex, and in particular, more preferably 22 dtex to 55 dtex.

The fineness of monofilaments constituting the multifilament yarns is preferably 0.5 to 5.5 dtex, and more preferably 0.5 to 3.0 dtex. When the monofilament fineness is less than 0.5 dtex, physical properties such as snag are likely to be poor, which is not preferred. When it is more than 5.5 dtex, the feeling tends to be course and hard, which is not preferred.

Figure 9:
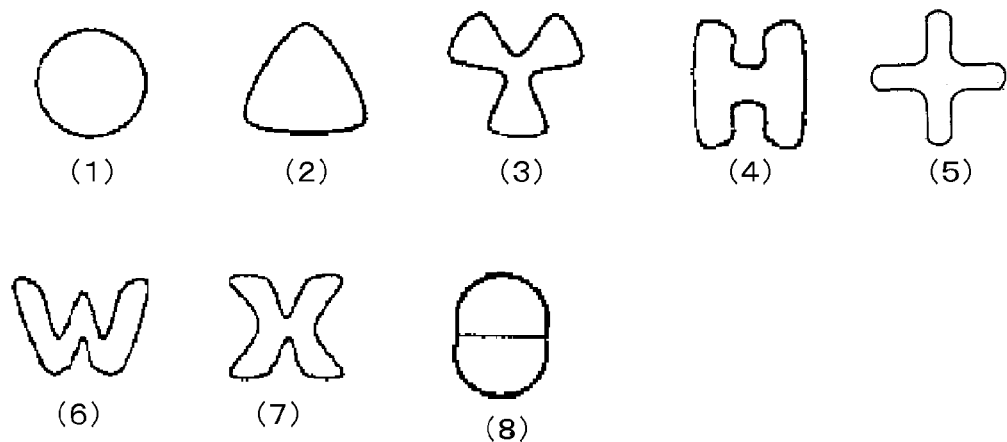
FIG. 9 is schematic cross-sectional views illustrating the cross-sectional shape of a monofilament constituting the synthetic fiber multifilament yarns used for an example of the cloth for swimsuits.

For the cross-sectional shape of the monofilament, a circular cross-section shown in FIG. 9 (1), a triangular cross-section shown in (2), a Y-shaped cross-section shown in (3), other modified cross-sections, and the like can be used without limitation. To form a microscopic bump/hollow shape on the front surface layer (a) of the swimsuit described above using thin monofilaments of synthetic fiber multifilament yarns, it is more preferable to use modified cross-section yarns such as yarns with the triangular cross-section shown in FIG. 9 (2), the Y-shaped cross-section shown in (3), an H-shaped cross-section shown in (4), a cross-shaped cross-section shown in (5), a W-shaped cross-section shown in (6), an X-shaped cross-section shown in (7), and further an oval cross-section having a hollow at the central part shown in (8).

On the other hand, as elastic fibers, any fibers that have rubber-like elasticity and come under JIS L0204-3 (2009) may be used. The fibers include a fiber having the properties of extending to 5 to 7 times its original length, for example, when subjected to an external force and restoring to nearly the original length by removing the external force. Specifically, a polyurethane elastic yarn, a polyester elastic yarn which expresses the elasticity as described above, a polyether/ester elastic yarn, a polystyrene elastic yarn, and the like can be employed.

The thickness of the elastic fibers is also not particularly limited. For example, those with a thickness of 22 dtex to 88 dtex can be preferably used and, in particular, those with a thickness of 33 dtex to 55 dtex can be more preferably used.

The synthetic fiber multifilament yarns and the elastic fibers described above are preferably combined and used as a composite yarn.

Examples of composite yarns include a single covered yarn obtained by covering a core yarn with a sheath yarn in one direction and a double covered yarn obtained by covering a core yarn doubly with a sheath yarn rightward and leftward, the core yarn being elastic fibers and the sheath yarn being synthetic fiber multifilament yarns. Another example of composite yarns is an air-mixed composite yarn in which more elastic fibers are arranged at the core side and more synthetic fiber multifilament yarns are arranged at the sheath side. In still another method, a core-sheath composite yarn in the form of plied yarn can be used. In this method, elastic fibers used as a core yarn are drafted, and doubled and twisted with synthetic fiber multifilament yarns used as a sheath yarn to obtain a core-sheath composite yarn.

To obtain such a composite yarn, a common covering machine, Italian throwing machine, downtwister, uptwister, doubletwister, or the like is used. In any of the covered yarn, air-mixed composite yarn, and plied yarn described above, synthetic fiber multifilament yarns used may be either a flat yarn or a false-twist textured yarn having crimps.

The composite yarn is not particularly limited as long as it takes a form of core-sheath composite yarn. However, elastic fibers are difficult to be stained or colored to a desired hue unlike synthetic fiber multifilament yarns, and it is difficult to make elastic fibers and synthetic fibers have the same color. Thus, to avoid degrading the quality level of the cloth, a covered yarn in which elastic fibers and synthetic fiber multifilament yarns are optimally arranged in such a manner that the elastic fibers are nearer to the core yarn side and the synthetic fiber multifilament yarns are nearer to the sheath side is preferably employed as the composite yarn. Further, to avoid the increase in the basis weight of the cloth, it is more preferred that a single covered yarn, which can achieve low covered-yarn fineness, be employed.

By using the above-described composite yarn such as a single covered yarn for warp and weft, a cloth for swimsuits having particularly excellent stretchability in the longitudinal direction and the transverse direction can be obtained.

In the case of a swimsuit worn in swimming that involves vigorous exercise such as competitive swimming, the problem of snags is likely to occur. Thus, when employing a single covered yarn, the twist constant at covering is preferably set high. The twist constant is preferably in the range of 6500 to 12000, and more preferably set in the range of 7500 to 11000 to achieve the best snag level.

The twist constant is calculated by the following equation:

Twist constant $K=(SS/D+SC)^{1/2} \times R$

SS: Fineness of spandex fiber (dtex)
SC: Fineness of sheath yarn (dtex)
D: Spandex fiber draft ratio
R: The number of coverings (T/M).

In covering, elastic fibers are drafted as appropriate and, to provide a highly stretchable cloth, the draft ratio is preferably 3 to 4, and more preferably 3.5 to 3.8. When the draft ratio is less than 3, it is difficult to provide a highly stretchable cloth and, on the other hand, when it is more than 4, process passability tends to decrease due to yarn breakage of the elastic fibers and the like.

The cloth is preferably provided with a microscopic bump/hollow shape on the cloth front surface corresponding to the opposite to the side that comes into contact with skin when worn as a swimsuit. The bump/hollow shape on the cloth front surface preferably has a height difference (height of bump shape) of 0.5 μm to 130 μm, more preferably 10 μm to 100 μm, and particularly preferably 10 μm to 70 μm. When the height difference is less than 0.5 μm or more than 130 μm, microbubbles decrease in number and become unstable in size.

By smoothing the front surface of the cloth as mentioned below, the bump/hollow shape on the cloth front surface can be further improved.

For the microscopic bump/hollow shape of the front surface, the interval between the bumps (interval between bump shapes) is preferably 0.5 μm to 180 μm, more preferably 10 to 150 μm, and particularly preferably 10 μm to 100 μm. When the interval between the bumps is less than 0.5 μm or more than 180 μm, similarly to the above, microbubbles decrease in number and become unstable in size.

In most cases, the bump/hollow shape of the front surface described above is formed by itself by using the synthetic fiber multifilament yarns described above, but not the circular cross-section shown in FIG. 9 (1) above but the modified cross-section yarns with a noncircular cross-sectional shape shown in FIGS. 9 (2) to (8) may be used to form a more desirable surface morphology.

Figure 2:
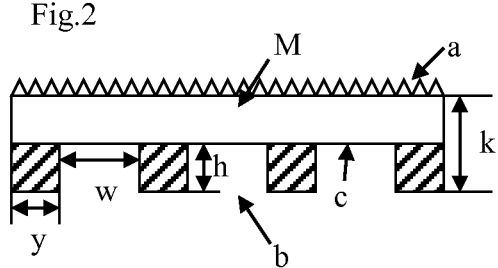
FIG. 2 is a schematic cross-sectional view of an example of our cloth for swimsuits.

On the other hand, the cloth back surface corresponding to the side that comes into contact with skin when worn as a swimsuit is provided with a relatively large bump/hollow shape that serves as an air-trap portion as mentioned above. For the bump/hollow shape, the height difference is 150 μm to 650 μm, and the width of the hollows is 100 μm to 5000 μm. The height difference of the bump/hollow shape is a value represented by h in the schematic cross-sectional view of the cloth shown in FIG. 2. When it is less than 150 μm, the amount of trapped air is decreased, which leads to decreased generation of microbubbles. When it is more than 650 μm, the depth of the hollows increases and, therefore, the amount of trapped air is satisfied; however, the total thickness of the cloth increases, and the cloth front surface becomes thin to cause lack of hiding, which are inappropriate as a swimsuit. The height difference is more preferably 200 μm to 500 μm, and still more preferably 200 μm to 400 μm.

Examples of the bump/hollow shape on the cloth back surface include, but are not limited to, those shown in the schematic plan views of the back surface of the cloth for swimsuits of FIG. 3 to FIG. 8. Specifically, there are aspects in which bumps are provided in a stripe pattern shown in FIG. 3, a dot pattern shown in FIG. 4, a grid pattern as shown in FIG. 5, further, a checkered pattern shown in FIG. 6, a border pattern (lateral stripe pattern) shown in FIG. 7, a polka-dot pattern shown in FIG. 8, a shape of alphabets such as A to Z (not shown), and the like. The bump/hollow shape on the cloth back surface may be appropriately selected and formed depending on the basis weight, thickness, elongation, quality level of the cloth front surface, appearance, and the like of the cloth for swimsuits.

The width of the hollows on the cloth back surface is a value represented by w in FIG. 2 to FIG. 8. The width of the hollows is 100 µm to 5000 µm. When the width of the hollows is less than 100 µm, the amount of trapped air is decreased, which leads to decreased generation of microbubbles. When it is more than 5000 µm, it means that the interval between the bumps on the back side becomes large, which affects the front surface of the cloth as an uneven pattern, leading to poor appearance as a swimsuit. The width of the hollows is more preferably 200 µm to 1200 µm.

The width of the bumps on the cloth back surface represented by y in FIG. 2 to FIG. 8 is preferably 100 µm to 5000 µm, and more preferably 200 µm to 3000 µm. When the width of the bumps is not less than 100 µm, the bumps are not readily deformed by wear pressure when worn as a swimsuit, and air-trap portions are easily formed in a stable manner. As a result, the amount of trapped air increases, and generation of microbubbles also increases. When it is not less than 5000 µm, the bumps on the back side can be prevented from affecting the cloth front surface as an uneven pattern, leading to excellent appearance as a swimsuit.

Further, to generate microbubbles in larger amounts, the hollows preferably account for 30% or more of the total area of the back surface on the cloth back surface. When the hollows account for 30% or more, similarly to the above, the amount of trapped air increases, and generation of microbubbles also increases. In view of the effect of an uneven pattern on the cloth front surface and the appearance as a swimsuit, the hollows preferably account for not more than 80%. Therefore, on the back surface, the hollows more preferably account for 30 to 80% of the total area of the back surface, still more preferably account for 40 to 80%, and particularly preferably account for 50 to 80%.

On the other hand, the bumps on the back surface preferably account for 20 to 70% of the total area of the back surface, more preferably account for 20 to 60%, and still more preferably account for 20 to 50%.

As described above, by optimizing the area ratio of the hollows and the bumps on the cloth back surface, generation of microbubbles can be more increased.

The bump/hollow shape described above can be formed, for example, as described below.

In general, to form a small bump/hollow shape on the back surface of a cloth, yarns having the same fineness are used for both warp and weft to form a cloth. However, in this method, because of small height difference of the bump/hollow shape, sufficient air-trap portions of interest cannot be formed on the cloth back surface.

In another method, a cloth is woven by using a large denier yarn for one of the warp and weft and a fine denier yarn for the other, whereby a relatively large bump/hollow shape can be formed on the back surface. However, in this method, it is highly likely that a large bump/hollow shape is formed also on the front surface of the cloth, which can, on the contrary, cause deterioration of water resistance property of fundamental interest.

For such reasons, it is preferable to use yarns having the same fineness for both warp and weft to satisfy the surface smoothness, basis weight, and thickness of a material for swimsuits for competitive swimming that aims at low water resistance and, on the cloth back surface, form a large bump/hollow shape that serves as an air-trap portion sufficient to generate microbubbles by cloth construction (e.g., double-cloth construction). Namely, it is preferred that the cloth for swimsuits have a front surface of almost flat construction having, for example, a microscopic bump/hollow shape and a back surface of bump/hollow construction.

The process for producing a cloth for this purpose is not particularly limited. For example, using a loom equipped with a dobby mechanism or a jacquard mechanism, and using a combination of any of the double-cloth constructions, warp double construction, weft double construction, and warp-weft double construction, a cloth can be woven such that the front surface is of flat construction such as plain construction, whereas the back surface is of bump/hollow construction.

Examples of the type of loom used for weaving include a water jet loom, air-jet loom, rapier loom, and the like, but are not limited thereto.

The bump/hollow shape on the back surface may be formed by embossing. Although the back surface construction of the cloth for embossing is not particularly limited, slightly thick plain construction and warp-weft double construction with both surfaces being of plain construction can be preferably used. Embossing increases the degree of freedom of pattern change in the bump/hollow shape. The pressure and temperature of embossing rolls in embossing may be selected in accordance with commonly used processing conditions for a polyester cloth or a nylon cloth.

In the case of a conventional and common 2-Way stretch plain cloth using for warp and weft a single covered yarn obtained by combining, for example, a sheath yarn comprising multifilament-yarn polyester fibers of 22 dtex to 110 dtex with a circular cross-section and a core yarn comprising elastic fibers of 22 dtex to 88 dtex, bumps and hollows due to the thickness (fineness) of the yarns used appear on the cloth back surface. However, such bumps and hollows due only to the thickness of the yarns used practically does not function as an air-trap portion because the height difference is as small as 10 µm to less than 150 µm, and the width of the hollows is less than 100 µm. Therefore, generation of microbubbles in swimming is very low, only from gaps between constituent monofilaments of the yarns used to form the cloth.

Then, both the front surface and the back surface of our cloth for swimsuits need to have a water-repellent finish.

When the back surface is treated with the water-repellent finish, air is readily trapped in the hollows on the back surface, and the hollows act as an air-trap portion. When the back surface is not treated with the water-repellent finish, it is continually in a hydrophilic state; consequently, the back surface cannot trap air, and practically cannot generate microbubbles.

Further, if the front surface is also treated with the water-repellent finish, the whole surface of the microscopic bump/hollow shape due to thin monofilaments of synthetic fiber multifilament yarns will have water-repellency. Consequently, when microbubbles are exhausted from the back surface side to the front surface side, the microbubbles are held between the front surface of the swimsuit and water by the effect of the water pressure (P) and the water-repellency of the microscopic bump/hollow-shaped front surface, forming the layer of microbubbles (B).

Examples of water-repellent agents that can be used here include common water-repellent agents such as fluorine water-repellent agents and silicon water-repellent agents, but are not limited thereto.

Further, equipment and conditions of a water-repellent finish may also be selected in accordance with commonly used conditions for a polyester 2-Way stretch cloth or a nylon 2-Way stretch cloth, and are not particularly limited. For example, water-repellent finish can be incorporated as a step in a dye-finishing process, and specific examples of the process in that case include examples such as open-width scouring/relaxing, intermediate setting, dyeing, water-repellent finish, and finish setting; or jet scouring/relaxing, dyeing, water-repellent finish, and finish setting, which may be selected as appropriate depending on the stretching ratio or the state of quality level of the front surface of a cloth of interest.

In addition to the water-repellent finish, as an incidental finish in the dyeing step, soil-resistant finish, antibacterial finish, deodorant finish, antibromic finish, mildew-resistant finish, ultraviolet absorbent finish, further, print finish, and the like can be selected as appropriate depending on the properties required, and can be carried out in combination.

It is also preferred that the front surface of the cloth for swimsuits be smoothed. "Smoothing" herein refers to a processing in which the bump/hollow shape and the like that are considered to degrade the water resistance property on the cloth front surface are crushed with heat, pressure, or the like to make the front surface smoother than before the processing. In particular, from the standpoint of processing stability and productivity, calendering is preferred as a specific means of smoothing. As a processing machine therefor, a calendering machine comprising a normal heated metal roll and a paper roll, or a cotton roll can be used, and when a heated metal roll is used, it is preferably a mirror-finished roll. Alternatively, a plate can also be used to perform calendering.

For example, calendering is preferably carried out under conditions of a linear pressure of 1 to 60 t per cloth width of 100 to 220 cm and a roll temperature of 130 to 250° C. Alternatively, smoothing can be carried out using a transfer printer having a heated metal roll and a leather belt.

The conditions of such smoothing may be set as appropriate depending on the type of cloth, roughness of the front surface, feeling, and the like without impairing the height and interval of the bumps of the microscopic bump/hollow shape on the cloth front surface mentioned above. In particular, this smoothing is preferably carried out, for example, when the roughness of the cloth front surface is conspicuous after finish setting by the influence of a cloth construction.

Such smoothing make the cloth front surface relatively flat and smooth, contributing to the effect of reducing water resistance.

The cloth for swimsuits preferably has an average elongation of 55% or more and an average elastic recovery of 75% or more in the longitudinal direction and the transverse direction. The elongation represents the degree of extension of the cloth for swimsuits. The larger this value is, when worn as a swimsuit, the more readily the swimsuit follows body movement; the more readily the swimsuit follows vigorous movement such as swimming; and a swimmer can move more easily and does not get tired easily. Elastic recovery represents the degree of recovery showing how quickly the swimsuit elongated by body movement returns to the original state. The larger this value is, when worn as a swimsuit, the better the swimsuit fits, and a swimmer can move more easily.

The elongation and the elastic recovery are preferably discussed as the average of the values in the longitudinal direction and the transverse direction of a cloth. This is because when a swimmer actually moves wearing the cloth as a swimsuit, the cloth is not elongated only in one direction, the longitudinal direction or the transverse direction, but the cloth is elongated three-dimensionally according to the roundness of a human body. This three-dimensional elongation property correlates and agrees well with the average elongation, which is the averaged elongation in the longitudinal direction and the transverse direction of the cloth, and the average elastic recovery.

The cloth as described above, preferably has an average elongation in the longitudinal direction and the transverse direction of 55% or more, more preferably 65% or more, and still more preferably 75% or more. If the average elongation is less than 55%, when a swimmer swims vigorously wearing a swimsuit, even in view of the ease between the swimsuit and skin, the swimsuit does not readily follow the body movement, and the swimmer gets tired easily, which is not preferred. On the other hand, when the average elongation is more than 130%, the swimsuit is relaxed by swimming, leading to difficulty in swimming.

The cloth preferably has an average elastic recovery in the longitudinal direction and the transverse direction of 75% or more, more preferably 80% or more, and still more preferably 85% or more. If the average elastic recovery is less than 75%, the swimsuit elongated by swimming remains elongated, and because of a poor fit to a body, the swimsuit does not readily follow body movement. Further, the appearance as a swimsuit will be poor. Although the average elastic recovery is preferably as near 100% as possible, when a covered yarn is used, the limit is about 95% because of deformation due to repeated elongation and recovery of the cloth.

The cloth for swimsuits preferably has an air permeability of 5 to 70 $cm^3/(cm^2 \cdot s)$, more preferably 5 to 50 $cm^3/(cm^2 \cdot s)$, and still more preferably 5 to 30 $cm^3/(cm^2 \cdot s)$.

It is necessary that air trapped in the hollows on the cloth back surface be pushed out by water pressure in water the cloth receives during swimming through microgaps between synthetic fiber multifilament yarns of the swimsuit or microscopic voids at intersections of warp and weft, and exhausted as microbubbles to the front surface of the swimsuit. When the air permeability described above is not less than 5 $cm^3/(cm^2 \cdot s)$, air trapped in the hollows on the cloth back surface is more readily pushed out by water pressure in water, and the amount of microbubbles exhausted to the front surface of the swimsuit will be increased. Consequently, a microbubble layer is readily formed.

Further, when the air permeability of the cloth is not more than 70 $cm^3/(cm^2 \cdot s)$, it can be prevented that the amount of air pushed out instantaneously from the cloth back surface side is excessively increased, and it can be prevented that microbubbles are not readily formed.

The value of air permeability described above is a value of air permeability measured when the cloth for swimsuits is under no tension. When actually worn as a swimsuit, the cloth is elongated by wearing tension in the longitudinal/transverse/oblique directions by about 20 to 30%, and even in view of such tension, the air permeability under no tension described above is judged to be sufficient if it is 5 to 70 $cm^3/(cm^2 \cdot s)$.

The basis weight of the cloth is preferably not more than 200 $g/m^2$. If it is more than 200 $g/m^2$, the cloth will be too heavy for a cloth for swimsuits for competitive swimming, and is likely to be of poor wearing comfort such that a swimmer feels heavy and his/her movement is impeded when swimming and, consequently, physical fatigue is increased, actually causing discomfort. In particular, the basis weight of 90 to 190 $g/m^2$ is preferred. If the basis weight is less than 90 $g/m^2$, although a swimmer can move easily, problems such as lack of hiding are likely to occur because the cloth is too thin for a cloth for swimsuits for competitive swimming which uses a small amount of backing cloth and the like, which is not preferred in terms of aesthetics. Further, the cloth is likely to be unsuitable for swimsuits in terms of texture physical properties; for example, bursting strength or tear strength is low.

The thickness of the cloth is preferably not more than 0.90 mm. If it is more than 0.90 mm, the cloth will be too thick for a cloth for swimsuits for competitive swimming, and is likely to be of poor wearing comfort such that a swimmer feels bulky and his/her movement is impeded when swimming and, consequently, physical fatigue is increased, actually causing discomfort. In particular, the thickness of 0.25 to 0.80 mm is preferred and, further, from the standpoint of ease of movement, the thickness of 0.35 to 0.60 mm is more preferred. If the thickness is less than 0.25 mm, as in the case of the basis weight mentioned above, although a swimmer can move easily, problems such as lack of hiding are likely to occur because the cloth is too thin for a cloth for swimsuits for competitive swimming which uses a small amount of backing cloth and the like, which is not preferred in terms of aesthetics. Further, the cloth is likely to be unsuitable for swimsuits in terms of texture physical properties. For example, bursting strength or tear strength is low.

The cloth for swimsuits is preferably formed from double cloths. When double cloths are employed, a cloth having high bursting strength and tear strength compared to those of single-cloth articles conventionally used is easily obtained. In light of the above, a cloth for swimsuits having a bursting strength of 350 kPa or more, further, of 400 kPa or more, can be obtained.

The cloth as described above is sewed into a swimsuit such that the cloth front surface mentioned above is at the right side of the swimsuit. By doing so, air trapped in the hollows on the cloth back surface can be exhausted as microbubbles to the front surface of the swimsuit by water pressure the cloth receives during swimming, and a layer of microbubbles can be formed at the boundary between the swimsuit and water.

It should be understood that our cloth may be used for the whole part or a particular part of a swimsuit and is not particularly restricted. By optimal use depending on the wearer, a swimsuit, in particular, a swimsuit for competitive swimming able to reduce water resistance due to generation of microbubbles and effective utilization thereof can be obtained.

EXAMPLES

Our cloth and swimsuits will now be described in more detail with reference to Examples and Comparative Examples, but this disclosure is not limited thereto. The evaluations used herein were each made by the following methods.

(1) Basis Weight of Cloth

After collecting three evaluation samples 100 cm long×100 cm wide from a final finished cloth, the mass was measured and the basis weight was expressed as the average value ($g/m^2$) of the three samples.

(2) Thickness of Cloth

Measurements were made in accordance with A Method described in JIS L 1096: 2010, Section 8.4. Namely, using a thickness meter, the thickness (mm) at five different points on a sample was measured in a given time and under constant pressure. The average value was calculated and rounded to two decimal places. The constant pressure in the measurement was 0.7 kPa.

(3) Elongation of Cloth

Measurements were made in accordance with Elongation A Method (Constant rate elongation method) described in JIS L 1096: 2010, Section 8.16.1. The strip method at a load of 17.6 N (1.8 kg) was employed, and test conditions were as follows: sample: 5 cm wide×20 cm long, clamp distance: 10 cm, and tensile speed: 20 cm/min. For the initial load, in accordance with the method of JIS L 1096: 2010, the weight a sample receives at a width of 1 m was used. The average value of three test results (%) in each of the longitudinal direction and the transverse direction of the sample was calculated and rounded to one decimal place.

(4) Average Elongation in Longitudinal Direction and Transverse Direction of Cloth From the average value of three test results (%) in each of the longitudinal direction and the transverse direction of the elongation of the cloth described above,

[Average value of test results of the longitudinal direction (%)+Average value of test results of the transverse direction (%)]/2 was calculated, and the average elongation in the longitudinal direction and the transverse direction of the cloth (%) was rounded to one decimal place.

(5) Elastic Recovery of Cloth

Measurements were made in accordance with A Method (Repeated constant elongation at constant speed method) described in JIS L 1096: 2010, Section 8.16.2 "Young's modulus (elastic recovery) and residual strain." The strip method at a load of 17.6 N (1.8 kg)/after repeating five times was employed, and test conditions were as follows: sample: 5 cm wide×20 cm long, clamp distance: 10 cm, and tensile speed: 20 cm/min. For the initial load, in accordance with the method of JIS L 1096: 2010, the weight a sample receives at a width of 1 m was used. The average value of three test results (%) in each of the longitudinal direction and the transverse direction of the sample was calculated and rounded to one decimal place.

(6) Average Elastic Recovery in Longitudinal Direction and Transverse Direction of Cloth From the average value of three test results (%) in each of the longitudinal direction and the transverse direction of the elastic recovery of the cloth described above,

[Average value of test results of the longitudinal direction (%)+Average value of test results of the transverse direction (%)]/2 was calculated, and the average elastic recovery in the longitudinal direction and the transverse direction of the cloth (%) was rounded to one decimal place.

(7) Air Permeability of Cloth

Measurements were made in accordance with A Method (Frajour type method) described in JIS L 1096: 2010, Section 8.26.1. Namely, after mounting a test piece at one end of a cylinder of a tester, a suction fan and an air vent were adjusted such that an inclined barometer shows a pressure of 125 Pa using a rheostat, and the pressure a vertical barometer shows then was measured. From the pressure measured and the type of the air vent used, the volume of air ($cm^3/(cm^2 \cdot s)$) that passed through the test piece was determined using a conversion table included in the tester. The average value of five test results was determined and rounded to one decimal place.

(8) Height Difference and Interval between Bumps in Microscopic Bump/Hollow Shape on Cloth Front Surface The front surface side of a cloth cross-section was photographed with a scanning electron microscope (manufactured by Hitachi High-Technologies Corporation, S-3400 N type) at 50 to 80×. At the photographing, it was designated that the height difference (height of bumps) and the interval between bumps (distance between peaks of adjacent bumps) in a microscopic bump/hollow shape on the cloth front surface were each measured. In view of difficulty in precise measurement to 1 μm, each measured value was rounded to the nearest ten. In cases where the adjacent bumps had a different height, the higher one was selected and measured. The average value of further 10 measuring results was employed.

(9) Width and Length of Hollows (or Bumps) in Bump/Hollow Shape on Cloth Back Surface The back surface side of a cloth cross-section was photographed with a scanning electron microscope (manufactured by Hitachi High-Technologies Corporation, S-3400 N type) at 50 to 80×. At the photographing, it was designated that the width and length of hollows (or bumps) in a bump/hollow shape on the cloth back surface were each measured. In view of difficulty in precise measurement to 1 μm, each measured value was rounded to the nearest ten. The average value of further 10 measuring results was employed.

(10) Height Difference (Height of Bumps) of Bump/Hollow Shape on Cloth Back Surface The back surface side of a cloth cross-section is photographed with a scanning electron microscope (manufactured by Hitachi High-Technologies Corporation, S-3400 N type) at 50 to 80×. At the photographing, a designation to measure the height difference (height of bumps) of a bump/hollow shape on a cloth back surface was made. In view of difficulty in precise measurement to 1 μm, each measured value was rounded to the nearest ten. In cases where the adjacent bumps had a different height, the higher one was selected and measured. The average value of further 10 measuring results was employed.

(11) Area Ratio of Hollows on Cloth Back Surface

Based on the width and length of bumps and hollows on a cloth back surface, the ratio of the total area of the hollows to the total area of the cloth back surface was calculated, and the average value of 10 measuring results was employed.

The hollows having a height difference from the adjacent bump of less than 150 μm or more than 650 μm and hollows having a width of less than 100 μm or more than 5000 μm were excluded from "the hollows" for calculating the area ratio, that is, the numerator.

(12) Water Resistance Property

Figure 10:
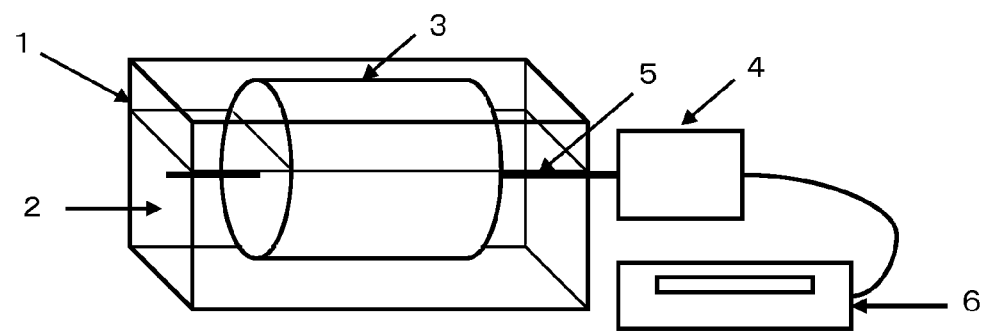
FIG. 10 is a schematic view of an apparatus for measuring the water resistance of a cloth for swimsuits.

A measuring apparatus shown in FIG. 10 was used to measure the water resistance property of a cloth for swimsuits. Namely, a high-performance torque motor 4 was mounted at one end of an axis 5 of a cylindrical plastic roll 3 (diameter: 22.5 cm, and length: 24 cm), which was fixed inside a box-shaped plastic tank 1 (width: 50 cm, length: 43 cm, and depth: 40 cm) such that the axis 5 rotates while being held horizontal. The roll 3 was also provided with a digital indicator 6 that indicates the resistance value of the torque motor 4 to revolution per set time period.

Next, a water 2 was poured into the tank 1 such that two thirds of the roll 3 were submerged in water in the diameter direction, and, at the same time, the number of revolutions of the roll 3 was set at 142 revolutions/50 seconds (surface speed: 2 m/sec). This speed corresponds to the speed at which a 100 m freestyle top swimmer swims 100 m in 50 seconds. Such conditions before mounting a sample are taken as an ideal.

Then, as a sample, three tubular evaluation samples (circumference: 58 cm, and width: 20 cm) were prepared such that the cloth front surface was outside. Assuming the worn state, the sample was elongated longitudinally and transversely both by 20%, and mounted on the roll 3 described above. While the conditions before mounting a sample described above was taken as an ideal (blank), a sample was mounted on the roll 3, and the resistance value (%) was measured when the roll rotated in water at 142 revolutions/50 seconds. The average value of the three samples was calculated and rounded to two decimal places.

A cloth with poor water resistance property will have a large resistance value (%) and, on the other hand, a cloth with excellent water resistance property will have a small resistance value (%).

(13) Generation Status of Microbubbles

Generation status of microbubbles was visually evaluated during the measurements of water resistance property described above. At the same time, photographs were taken using a high-speed camera (manufactured by Photron Corporation, FASTCAM-APS RS type) and imported into a personal computer, and generation status of microbubbles was checked again. Because it was difficult to precisely measure the size of microbubbles generated in an experiment, those which were visually judged to have a diameter of about 1 mm or less were judged as microbubbles. The criterion of the visual judgment is as follows:

A: Microbubbles generate in large amounts;
B: Microbubbles generate; and
F: Almost no microbubble generate.

(14) Overall Judgment as Swimsuit Material

The criterion is as follows:

A: Very easy to swim with because of ease of movement, lightness of body, and the like and very suitable as a material for swimsuits for competitive swimming;
B: Allows swimming without impeding movement much and suitable as a material for swimsuits for competitive swimming; and
F: Difficult to move with or not make a body feel light, and not excellent as a material for swimsuits for competitive swimming.

Example 1

A single covered yarn (core yarn draft ratio: 3.5, and twist constant: 8100) was produced using, as a sheath yarn, a flat yarn of cationic-dyeable polyester (33 dtex/24 filaments, monofilament: triangular-shaped cross-section original yarn shown in FIG. 9 (2), "Tetoron" (registered trademark) available from TORAY INDUSTRIES, INC.) and, as a core yarn, a polyurethane elastic fiber (44 dtex, "Lycra" (registered trademark) available from TORAY OPELONTEX CO., LTD.). Using the single covered yarn, a gray fabric of weft double construction of reed density: 80 dents/sun (Japanese unit of length, about 3.03 cm), reed insertion: two warps, and weft density: 125 yarns/2.54 cm, the gray fabric having a bump/hollow shape shown in FIG. 4 on the back surface, was woven with an air-jet loom provided with a dobby mechanism.

Thereafter, in accordance with an ordinary dyeing process for a cationic-dyeable polyester 2-Way stretch cloth, the gray fabric was subjected to scouring/relaxing in a 95° C. bath, cationic dyeing in a 125° C. bath, and further a water-repellent finish to be finished as a cloth for swimsuits with a final width of 102 cm and a weft density of 210 yarns/2.54 cm.

For this cloth, the bump/hollow shape on the back surface had a height difference of 220 μm, a hollow width of 1000 μm, and an area ratio of hollows of 78%. The bump/hollow shape on the front surface had a height difference of 61 μm and an interval between bumps of 133 μm.

Further, this cloth had an air permeability of 13.3 cc/(cm$^2$·s), a basis weight of 151 g/m$^2$, a thickness of 0.46 mm, an average elongation of 71.4%, and an average elastic recovery of 85.7%.

The water resistance property of this cloth was measured to be 1.2%, which was very excellent. The amount of generation of microbubbles observed when measuring the water resistance property was very large.

Further, a swimsuit for competitive swimming made totally of this cloth with the front surface of the cloth on the right side was experimentally made, and breaststroke try-on evaluation was carried out by five males and five females (19- to 22-year-old college students) to confirm that the cloth was very easy to swim with because of ease of movement, lightness of body, and the like and excellent as a material for swimsuits for competitive swimming. These evaluation results are shown in Table 1.

Example 2

A single covered yarn (core yarn draft ratio: 3.5, and twist constant: 8500) was produced using, as a sheath yarn, a flat yarn of nylon (24 dtex/7 filaments, monofilament: round-shaped cross-section original yarn shown in FIG. 9 (1), available from TORAY INDUSTRIES, INC.) and, as a core yarn, a polyurethane elastic fiber (44 dtex, "Lycra" (registered trademark) available from TORAY OPELONTEX CO., LTD.). Using the single covered yarn, a gray fabric of weft double construction of reed density: 90 dents/sun, reed insertion: two warps, and weft density: 110 yarns/2.54 cm, the gray fabric having a bump/hollow shape shown in FIG. 3 on the back surface, was woven with an air-jet loom provided with a dobby mechanism.

Thereafter, in accordance with an ordinary dyeing process for a nylon 2-Way stretch cloth, the gray fabric was subjected to scouring/relaxing in a 80° C. bath, acidic dyeing in a 95° C. bath, and further a water-repellent finish to be finished as a cloth for swimsuits with a final width of 104 cm and a weft density of 190 yarns/2.54 cm.

For this cloth, the bump/hollow shape on the back surface had a height difference of 200 μm, a hollow width of 500 μm, and an area ratio of hollows of 61%.

The bump/hollow shape on the front surface had a height difference of 44 μm and an interval between bumps of 101 μm.

Further, this cloth had an air permeability of 21.3 cc/(cm$^2$·s), a basis weight of 133 g/m$^2$, a thickness of 0.41 mm, an average elongation of 82.5%, and an average elastic recovery of 83.0%.

The water resistance property of this cloth was measured to be 2.0%, which was very excellent. The amount of generation of microbubbles observed when measuring the water resistance property was very large.

Further, a swimsuit for competitive swimming made totally of this cloth with the front surface of the cloth on the right side was experimentally made, and breaststroke try-on evaluation was carried out by five males and five females (the same subjects as in Example 1) to confirm that the cloth was very easy to swim with because of ease of movement, lightness of body, and the like and excellent as a material for swimsuits for competitive swimming. These evaluation results are also shown in Table 1.

Example 3

Using a false-twist textured yarn of cationic-dyeable polyester (33 dtex/48 filaments, monofilament: round-shaped cross-section original yarn shown in FIG. 9 (1), "Tetoron" (registered trademark) available from TORAY INDUSTRIES, INC.) and a polyurethane elastic fiber (44 dtex, "Lycra" (registered trademark) available from TORAY OPELONTEX CO., LTD.), an air-mixed composite textured yarn of core-sheath type was produced with an air-mixing machine such that the false-twist textured yarn of cationic-dyeable polyester was arranged at the sheath side and the polyurethane elastic fiber at the core side.

Using the air-mixed composite textured yarn, a gray fabric of weft double construction of reed density: 80 dents/sun, reed insertion: two warps, and weft density: 125 yarns/2.54 cm, the gray fabric having a bump/hollow shape shown in FIG. 5 on the back surface, was woven with an air-jet loom provided with a dobby mechanism.

Thereafter, in accordance with an ordinary dyeing process for a cationic-dyeable polyester 2-Way stretch cloth, the gray fabric was subjected to scouring/relaxing in a 95° C. bath, cationic dyeing in a 125° C. bath, and further a water-repellent finish to be finished as a cloth for swimsuits with a final width of 102 cm and a weft density of 210 yarns/2.54 cm.

Further, the front surface of this cloth was smoothed using a calendering process machine comprising a heated metal roll and a paper roll.

For this cloth, the bump/hollow shape on the back surface had a height difference of 310 μm, a hollow width of 900 μm, and an area ratio of hollows of 54%.

The bump/hollow shape on the front surface had a height difference of 15 μm and an interval between bumps of 142 μm.

Further, this cloth had an air permeability of 10.0 cc/(cm$^2$·s), a basis weight of 157 g/m$^2$, a thickness of 0.52 mm, an average elongation of 66.0%, and an average elastic recovery of 80.0%.

The water resistance property of this cloth was measured to be 1.8%, which was excellent. The amount of generation of microbubbles observed when measuring the water resistance property was very large.

Further, a swimsuit for competitive swimming made totally of this cloth with the front surface of the cloth on the right side was experimentally made, and breaststroke try-on evaluation was carried out by five males and five females (the same subjects as in Example 1) to confirm that although the average elongation was somewhat low compared to Examples 1 and 2, the cloth was very easy to swim with because of ease of movement, lightness of body, and the like and excellent as a material for swimsuits for competitive swimming. These evaluation results are also shown in Table 1.

Example 4

Figure 3:
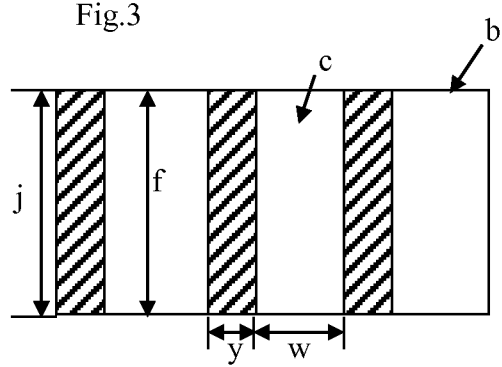
FIG. 3 is a schematic plan view of the back surface of an example of the cloth for swimsuits.
Figure 7:
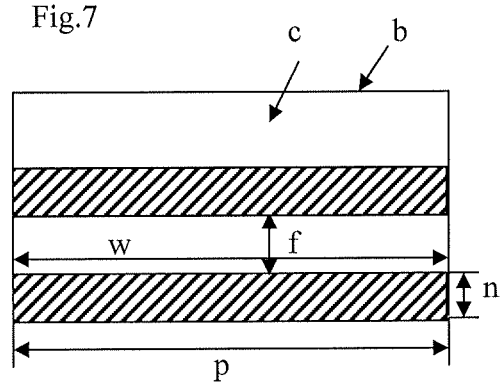
FIG. 7 is a schematic plan view of the back surface of an example of the cloth for swimsuits.
Figure 8:
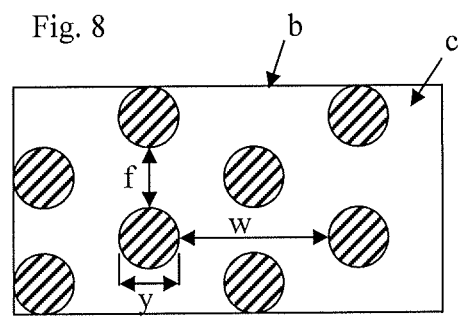
FIG. 8 is a schematic plan view of the back surface of an example of the cloth for swimsuits.

Using the same single covered yarn as in Example 1, a gray fabric of weft double construction of reed density: 80 dents/sun, reed insertion: two warps, and weft density: 125 yarns/2.54 cm, the gray fabric having a bump/hollow shape shown in FIG. 3 on the back surface, was woven with an air-jet loom provided with a dobby mechanism Thereafter, dyeing and water-repellent finishing were carried out in the same manner as in Example 1, and the gray fabric was finished as a cloth for swimsuits with a final width of 102 cm and a weft density of 210 yarns/2.54 cm.

For this cloth, the bump/hollow shape on the back surface had a height difference of 250 μm, a hollow width of 400 μm, and an area ratio of hollows of 22%.

The bump/hollow shape on the front surface had a height difference of 55 μm and an interval between bumps of 120 μm.

Further, this cloth had an air permeability of 12.9 cc/(cm$^2$·s), a basis weight of 160 g/m$^2$, a thickness of 0.48 mm, an average elongation of 72.3%, and an average elastic recovery of 88.1%.

The water resistance property of this cloth was measured to be 3.1%. Generation of microbubbles was also observed when measuring the water resistance property.

Further, a swimsuit for competitive swimming made totally of this cloth with the front surface of the cloth on the right side was experimentally made, and breaststroke try-on evaluation was carried out by five males and five females (the same subjects as in Example 1) to confirm that the cloth allowed swimming without impeding movement much and was suitable as a material for swimsuits for competitive swimming. These evaluation results are also shown in Table 1.

Example 5

Using the same single covered yarn as in Example 1, a gray fabric composed of common plain construction with a weft density of 115 yarns/2.54 cm was woven with the same air-jet loom provided with a dobby mechanism as in Example 1. Thereafter, the gray fabric was subjected to the same dyeing and water-repellent finishing as in Example 1 to produce a cloth with a final width of 110 cm and a weft density of 190 yarns/2.54 cm.

Further, this cloth was provided on its back surface with a bump/hollow pattern shown in FIG. 6 with an embossing machine to be finished as a cloth for swimsuits. The pressure and temperature of embossing rolls in embossing were selected in accordance with common processing conditions used for a polyester cloth.

For this cloth, the bump/hollow shape on the back surface had a height difference of 410 μm, a hollow width of 300 μm, and an area ratio of hollows of 50%.

The bump/hollow shape on the front surface had a height difference of 32 μm and an interval between bumps of 113 μm.

Further, this cloth had an air permeability of 9.5 cc/(cm$^2$·s), a basis weight of 165 g/m$^2$, a thickness of 0.58 mm, an average elongation of 74.0%, and an average elastic recovery of 87.5%.

The water resistance property of this cloth was measured to be 2.5%. Generation of microbubbles was also observed when measuring the water resistance property.

Further, a swimsuit for competitive swimming made totally of this cloth with the front surface of the cloth on the right side was experimentally made, and breaststroke try-on evaluation was carried out by five males and five females (the same subjects as in Example 1) to confirm that the cloth was very easy to move and swim with and suitable as a material for swimsuits for competitive swimming. These evaluation results are also shown in Table 1.

Comparative Example 1

Using the same single covered yarn as in Example 1, a gray fabric composed of common plain construction with a weft density of 115 yarns/2.54 cm was woven with the same air-jet loom provided with a dobby mechanism as in Example 1. Thereafter, the gray fabric was subjected to the same dyeing and water-repellent finishing as in Example 1 to be finished as a cloth for swimsuits with a final width of 110 cm and a weft density of 190 yarns/2.54 cm.

This cloth was of common plain construction and, therefore, a large bump/hollow portion that serves as an air-trap portion was not formed on the back surface. The bump/hollow shape on the back surface had a height difference of 40 μm, a hollow width of 70 μm, and an area ratio of hollows as defined above of 0%.

The bump/hollow shape on the front surface had a height difference of 59 μm and an interval between bumps of 121 μm.

Further, this cloth had an air permeability of 24.2 cc/(cm$^2$·s), a basis weight of 120 g/m$^2$, a thickness of 0.31 mm, an average elongation of 71.0%, and an average elastic recovery of 88.5%.

The water resistance property of this cloth was measured to be 3.8%, which was inferior to those of Examples. Further, microbubbles did not generate when measuring the water resistance property.

Further, a swimsuit for competitive swimming made totally of this cloth with the front surface of the cloth on the right side was experimentally made, and breaststroke try-on evaluation was carried out by five males and five females (the same subjects as in Example 1) to confirm that the cloth did not make the body feel light although the movement was not impeded and was felt to be not excellent as a material for swimsuits for competitive swimming. These evaluation results are also shown in Table 1.

Comparative Example 2

Using the same single covered yarn as in Example 1, a gray fabric of weft double construction with a weft density of 125 yarns/2.54 cm, the gray fabric having a bump/hollow shape shown in FIG. 5 on the back surface, was woven with the same air jet loom provided with a dobby mechanism as in Example 1. Thereafter, the gray fabric was subjected to the same dyeing as in Example 1 but no water-repellent finishing to be finished as a cloth for swimsuits with a final width of 103 cm and a weft density of 212 yarns/2.54 cm.

For this cloth, the bump/hollow shape on the back surface had a height difference of 210 μm, a width of hollows of 300 μm, and an area ratio of hollows of 25%.

The bump/hollow shape on the front surface had a height difference of 63 μm and an interval between bumps of 110 μm.

Further, this cloth had an air permeability of 10.7 cc/(cm$^2$·s), a basis weight of 210 g/m$^2$, a thickness of 0.51 mm, an average elongation of 50.0%, and an average elastic recovery of 86.0%.

The water resistance property of this cloth was measured to be 6.4%, which was poor. Further, microbubbles did not generate when measuring the water resistance property.

Further, a swimsuit for competitive swimming made totally of this cloth with the front surface of the cloth on the right side was experimentally made, and breaststroke try-on evaluation was carried out by five males and five females (the same subjects as in Example 1) to confirm that the cloth was difficult to move with, made the swimsuit feel heavy, did not make the body feel light, and was felt to be not excellent as a material for swimsuits for competitive swimming. These evaluation results are also shown in Table 1.

TABLE 1

| | | Example 1 | Example 2 | Example 3 | Example 4 | Example 5 | Comparative Example 1 | Comparative Example 2 |
|---|---|---|---|---|---|---|---|---|
| Yarn Used | Sheath Yarn | PET 33T-24f | N 24T-7f | PET 33T-48f | PET 33T-24f | PET 33T-24f | PET 33T-24f | PET 33T-24f |
| | Core Yarn | Ly 44T | Ly 44T | Ly 44T | Ly 44T | Ly 44T | Ly 44T | Ly 44T |
| Back Surface Structure | | FIG. 4 | FIG. 3 | FIG. 5 | FIG. 3 | FIG. 6 | FIG. 9 | FIG. 5 |
| Cloth Back Surface | Height Difference of Bump/Hollow Portion (μm) | 220 | 200 | 310 | 250 | 410 | 40 | 210 |

TABLE 1-continued

|  |  | Example 1 | Example 2 | Example 3 | Example 4 | Example 5 | Comparative Example 1 | Comparative Example 2 |
|---|---|---|---|---|---|---|---|---|
|  | Hollow Width (μm) | 1000 | 500 | 900 | 400 | 300 | 70 | 300 |
|  | Area ratio of Hollows (%) | 78 | 61 | 54 | 22 | 50 | 0 | 25 |
| Cloth Front Surface | Height Difference of Bump/Hollow Portion (μm) | 61 | 44 | 15 | 55 | 32 | 59 | 63 |
|  | Interval between Bumps (μm) | 133 | 101 | 142 | 120 | 113 | 121 | 110 |
| Performance of Water-Repellent Finish |  | Performed | Performed | Performed | Performed | Performed | Performed | Not Performed |
| Air Permeability (cc/(cm² · s)) |  | 13.3 | 21.3 | 10.0 | 12.9 | 9.5 | 24.2 | 10.7 |
| Basis Weight (g/m²) |  | 151 | 133 | 157 | 160 | 165 | 120 | 210 |
| Thickness (mm) |  | 0.46 | 0.41 | 0.52 | 0.48 | 0.58 | 0.31 | 0.51 |
| Average Elongation (%) |  | 71.4 | 82.5 | 66.0 | 72.3 | 74.0 | 71.0 | 50.0 |
| Average Elastic Recovery (%) |  | 85.7 | 83.0 | 80.0 | 88.1 | 87.5 | 88.5 | 86.0 |
| Water Drag (%) |  | 1.2 | 2.0 | 1.8 | 3.0 | 2.4 | 3.8 | 6.4 |
| Generation Status of Microbubbles |  | A | A | A | B | A | F | F |
| Overall Judgment as Swimsuit Material |  | A | A | A | B | A | F | F |

PET: Polyester, N: Nylon, Ly: Lycra, T: Dtex, F: The number of filaments

INDUSTRIAL APPLICABILITY

Our cloth for swimsuits has a texture design that generates microbubbles by which water resistance can be reduced more than before when a swimmer swims wearing a swimsuit made of the cloth while satisfying various properties required for a material for swimsuits and, therefore, can be suitably used, of course, for a general swimsuit and particularly for a swimsuit for competitive swimming.

The invention claimed is:

1. A swimsuit cloth comprising synthetic fiber multifilament yarns and elastic fibers, wherein a front surface and a back surface of the cloth have a water-repellent finish(es); bumps and hollows are formed on the back surface; the bumps and hollows on the back surface have a height difference of 150 μm to 650 μm; and the hollows have a width of 100 μm to 5000 μm.

2. The cloth according to claim 1, wherein said synthetic fiber multifilament yarns are at least one selected from the group consisting of polyester fibers, polyamide fibers, and polypropylene fibers.

3. A swimsuit comprising at least a portion of the cloth according to claim 2, wherein said front surface of the cloth is on its right side.

4. The cloth according to claim 1, wherein a composite yarn composed of said elastic fibers as a core yarn and said synthetic fiber multifilament yarns as a sheath yarn is used for warp and weft.

5. A swimsuit comprising at least a portion of the cloth according to claim 4, wherein said front surface of the cloth is on its right side.

6. The cloth according to claim 1, wherein bumps and hollows are formed also on said front surface; the bumps and hollows of the front surface have a height difference of 0.5 μm to 130 μm; and an interval between the bumps is 0.5 μm to 180 μm.

7. A swimsuit comprising at least a portion of the cloth according to claim 6, wherein said front surface of the cloth is on its right side.

8. The cloth according to claim 1, wherein on said back surface, the hollows account for 30% or more of the total area of the back surface.

9. A swimsuit comprising at least a portion of the cloth according to claim 8, wherein said front surface of the cloth is on its right side.

10. The cloth according to claim 1, wherein the bumps and hollows on said back surface are formed by a cloth construction and/or embossing.

11. The cloth according to claim 10, wherein said cloth construction is a double-cloth construction.

12. A swimsuit comprising at least a portion of the cloth according to claim 11, wherein said front surface of the cloth is on its right side.

13. A swimsuit comprising at least a portion of the cloth according to claim 10, wherein said front surface of the cloth is on its right side.

14. The cloth according to claim 1, wherein said front surface is smoothed.

15. A swimsuit comprising at least a portion of the cloth according to claim 14, wherein said front surface of the cloth is on its right side.

16. A swimsuit comprising at least a portion of the cloth according to claim 1, wherein said front surface of the cloth is on its right side.

* * * * *